United States Patent
Baumann et al.

(10) Patent No.: US 10,086,906 B2
(45) Date of Patent: Oct. 2, 2018

(54) METHOD AND APPARATUS FOR CONTROLLING AUTOMATIC GEAR-CHANGE PROCESSES OF AN ELECTRIC GEAR-CHANGE APPARATUS OF A BICYCLE

(71) Applicant: SRAM Deutschland GmbH, Schweinfurt (DE)

(72) Inventors: Sven Baumann, Grettstadt (DE); Egon Schmittfull, Schleerieth (DE); Uwe Seufert, Bad Kissingen (DE)

(73) Assignee: SRAM, LLC, Chicago, IL (US)

( * ) Notice: Subject to any disclaimer, the term of this patent is extended or adjusted under 35 U.S.C. 154(b) by 34 days.

(21) Appl. No.: 14/995,529

(22) Filed: Jan. 14, 2016

(65) Prior Publication Data

US 2016/0200396 A1    Jul. 14, 2016

(30) Foreign Application Priority Data

Jan. 14, 2015  (DE) .......................... 10 2015 000 422

(51) Int. Cl.
| | |
|---|---|
| *B62M 25/08* | (2006.01) |
| *F16H 59/44* | (2006.01) |
| *F16H 61/02* | (2006.01) |
| *F16H 59/70* | (2006.01) |
| *B62M 9/06* | (2006.01) |

(Continued)

(52) U.S. Cl.
CPC .............. *B62M 25/08* (2013.01); *B62M 9/06* (2013.01); *B62M 9/122* (2013.01); *B62M 9/123* (2013.01); *B62M 11/16* (2013.01); *F16H 59/44* (2013.01); *F16H 59/70* (2013.01); *F16H 61/0213* (2013.01); *F16H 2300/18* (2013.01)

(58) Field of Classification Search
CPC ...... F16H 59/44; F16H 59/70; F16H 61/0213; F16H 2300/18; B62M 9/122; B62M 9/123

See application file for complete search history.

(56) References Cited

U.S. PATENT DOCUMENTS

| | | | | |
|---|---|---|---|---|
| 3,255,642 A | * | 6/1966 | Christenson ............ | F16H 47/08 192/12 A |
| 4,335,428 A | * | 6/1982 | Miki ....................... | F16H 59/66 477/901 |

(Continued)

FOREIGN PATENT DOCUMENTS

| | | |
|---|---|---|
| EP | 0899188 A2 | 3/1999 |
| EP | 1188661 A2 | 3/2002 |
| WO | 02/055373 A2 | 7/2002 |

*Primary Examiner* — Ramya P Burgess
*Assistant Examiner* — David R Morris

(57) ABSTRACT

Controlling automatic gear-changing of an electric gear-change apparatus of a bicycle, the method may involve assigning each of a plurality of gears of the bicycle a predetermined gearing range. Controlling the process may also involve assigning a predetermined lower limit value and a predetermined upper limit value to each gearing range, wherein the upper limit value of a gearing range is in each case larger by a predetermined value than the lower limit value of a next higher gearing range, and the upper limit value of the gearing range and the lower limit value of the next higher gearing range define between them an overlap range. Controlling the process may also involve selecting an engagement of either a gear or a next higher gear in the overlap range depending on a speed profile of the bicycle.

20 Claims, 9 Drawing Sheets

(51) Int. Cl.
*B62M 9/122* (2010.01)
*B62M 9/123* (2010.01)
*B62M 11/16* (2006.01)

(56) References Cited

U.S. PATENT DOCUMENTS

| | | | | |
|---|---|---|---|---|
| 4,599,917 | A | * | 7/1986 | Leorat ................. F16H 61/0213 |
| | | | | 477/120 |
| 5,059,158 | A | | 10/1991 | Bellio |
| 5,261,858 | A | | 11/1993 | Browning |
| 6,146,297 | A | | 11/2000 | Kimura |
| 6,454,288 | B1 | * | 9/2002 | Horiuchi ................ B62M 9/122 |
| | | | | 280/260 |
| 9,234,580 | B1 | * | 1/2016 | Usui ...................... B62M 25/08 |
| 2002/0094906 | A1 | | 7/2002 | Jordan |

* cited by examiner

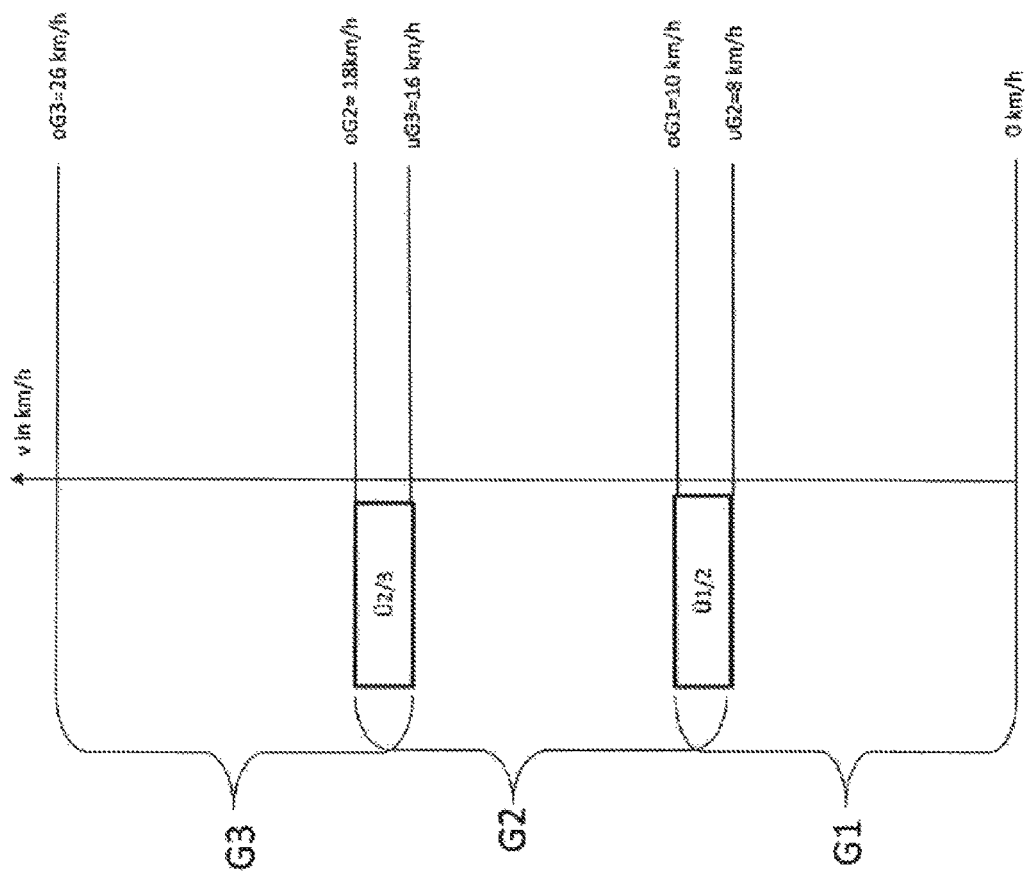

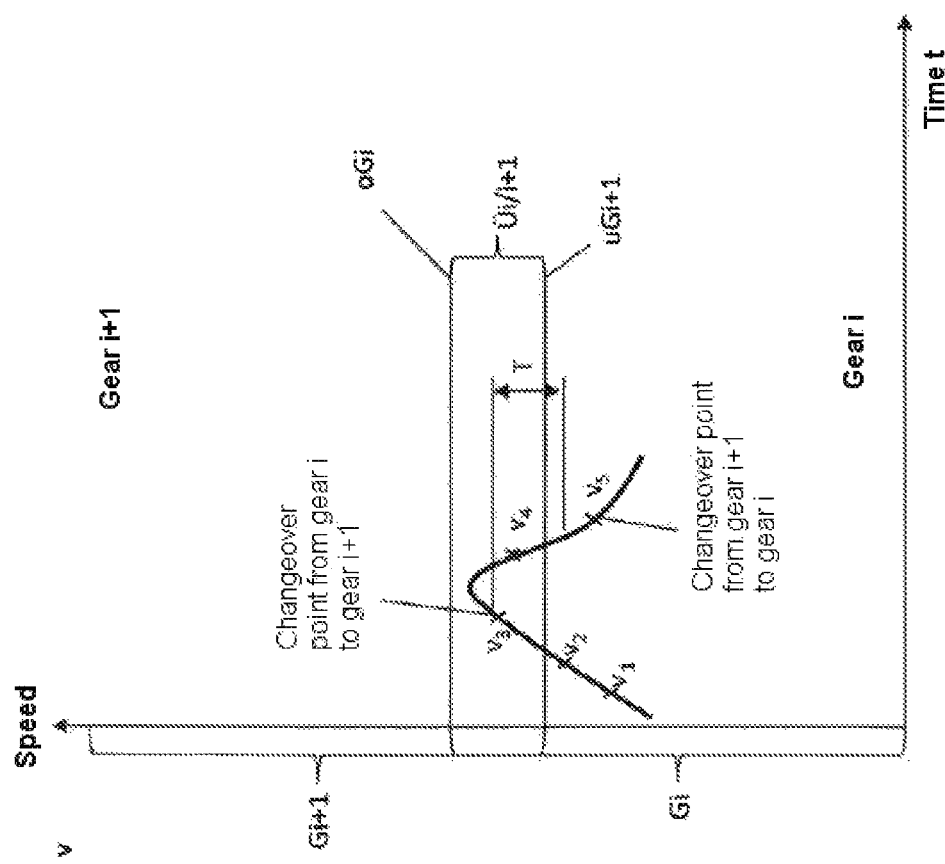

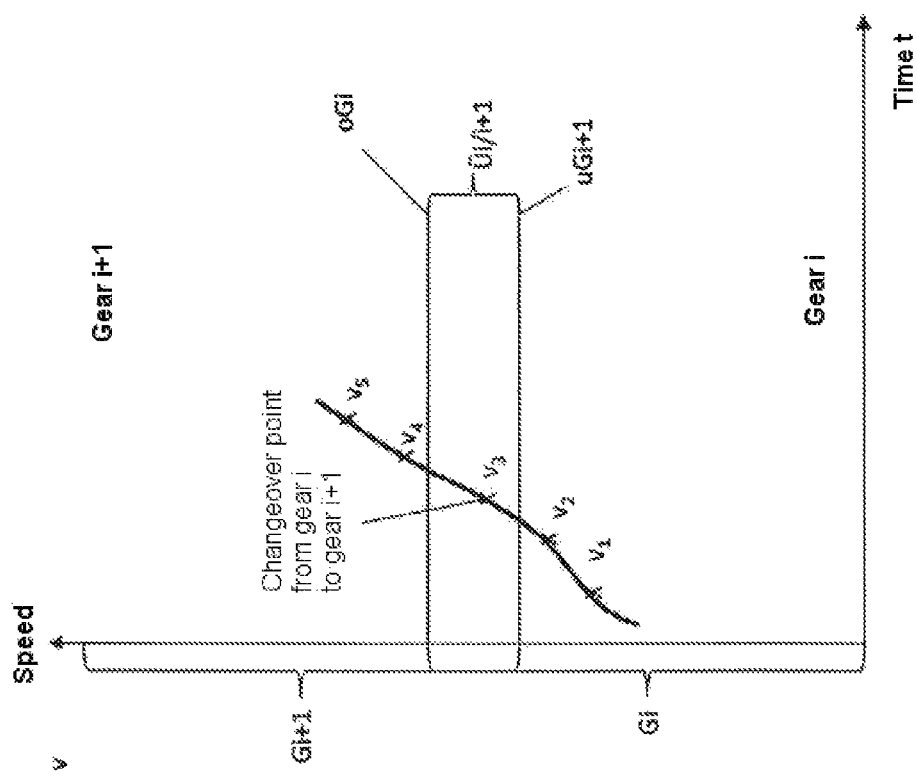

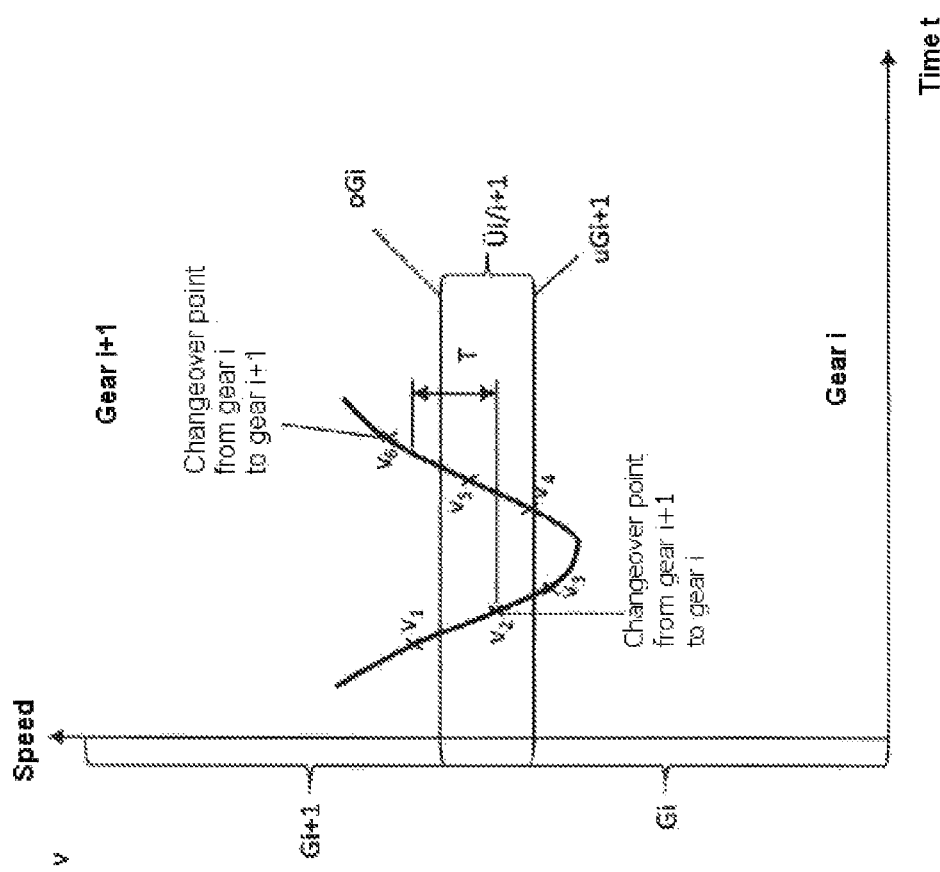

METHOD AND APPARATUS FOR CONTROLLING AUTOMATIC GEAR-CHANGE PROCESSES OF AN ELECTRIC GEAR-CHANGE APPARATUS OF A BICYCLE

This application claims the benefit of DE 10 2015 000 422.0, filed on Jan. 14, 2015.

FIELD OF THE INVENTION

The present invention relates to a method and an apparatus for controlling automatic gear-changing processes of an electric gear-change apparatus of a bicycle.

BACKGROUND

Various control methods of this type and control apparatuses are known from the prior art.

U.S. Pat. No. 5,261,858 discloses an automatic control method for a bicycle gear shift that provides adjustable hysteresis. This hysteresis is used to ensure that changing back and forth between individual gears does not occur too often. When the bicycle is changed into a new gear, the computer determines a desired wheel speed and an upward change wheel speed and a downward change wheel speed for the new gear. The desired wheel speed is achieved when the pedals of the bicycle are operated at the desired pedalling frequency in the new gear. The upward change wheel speed refers to the wheel speed at which the computer automatically changes into a higher gear, and the downward change wheel speed refers to the wheel speed at which the computer automatically changes into a lower gear. The upward change wheel speed is set such that it is greater than the current wheel speed, and the downward change speed is set so that it is lower than the current wheel speed. The setting of these upward change and downward change wheel speeds results in a hysteresis effect. When the current wheel speed exceeds or falls below the upward change wheel speed or the downward change wheel speed respectively, the computer generates an upward change signal or a downward change signal if the crank and hub arrangements are suitably positioned. According to U.S. Pat. No. 5,261,858 the computer can adjust the upward change or downward change wheel speed in particular situations in order to ensure a steady pedalling frequency.

EP 0 899 188 B1 discloses a method for automatic gear-changing in a gear mechanism of a bicycle through a gear control in accordance with a determined speed of the bicycle. According to EP 0 899 188 B1 different bicycle speeds are stored in a first speed table, in a second speed table, in a third speed table and in a fourth speed table. A decision is taken as to whether to change between individual gears with reference to the bicycle speeds stored in the speed tables.

U.S. Pat. No. 5,059,158 discloses an electronic control system for a gear of a bicycle. The system calculates continuously, in a fully automatic operating system, the theoretical cadence (pedalling frequency) of the rider for the current gear ratio and the current bicycle speed. The system then determines whether the calculated cadence lies within the limits chosen by the rider. If the calculated cadence is too low, the system informs the rider through audible or visible signals, and then automatically changes into the next lower gear in order to increase the rider's cadence. If, conversely, the calculated cadence is too high, the system informs the rider through audible or visible signals, and then automatically changes into the next higher gear in order to decrease the rider's cadence. The system maintains the rider's cadence within preset limits for all gear ratios and bicycle speeds.

WO 02/055373 A2 furthermore discloses an automatic gear system for a bicycle.

It is an object of the present invention to provide a method for controlling automatic gear-changing processes of an electric gear-change apparatus with which the riding comfort of a bicycle rider when using an automated gear-change apparatus can be further improved.

SUMMARY AND DESCRIPTION

In an embodiment, a predetermined gearing range is assigned to each gear. Gearing range refers to a range of values for specific parameters, for example the bicycle speed, the pedalling frequency, the wheel rotation rate, a GPS signal etc. A predetermined lower limit value and a predetermined upper limit value are assigned to each gearing range. The upper limit value of a gearing range is, in each case, larger by a predetermined value than the lower limit range of the next higher gearing range. Between them, the upper limit value of a gearing range and the lower limit value of the next higher gearing range define an overlap range. Depending on the speed profile of the bicycle, a gear i or a next higher gear i+1 may be engaged, or continue engagement, in the overlap range.

The speed profile of the bicycle depends heavily on the riding conduct of the rider and on the particular riding situation. In an embodiment, the riding behaviour and the riding situation can both affect the automatic gear-changing. In other words, a decision is taken with reference to the rider's riding behaviour as to when which gear is engaged, or which gear will remain engaged, in the overlap range between two neighbouring gearing ranges. In this context, speed profile refers to the development of the bicycle's speed over time.

In the known prior art, changeover, or shift, points for automatic gear-changing are determined by means of a hysteresis in order to specify continuous changing back and forth between the changeover points for upward change and downward change. Specifying the changeover points by means of a hysteresis in this way can be experienced as uncomfortable when riding. The presented embodiments improve the behaviour of an automatic control of an electric gear-change apparatus in that, in the overlap range between two gearing ranges, a determination is made with reference to the rider's behaviour and/or the riding situation as to whether a current or active gear i remains engaged or a gear i+1 is engaged. This is done, as explained above, depending on the profile of the speed of the bicycle.

Furthermore, in an embodiment, predefined speed values that can, for example, be read from tables, are not used exclusively, but the profile of the speed reflects the riding situation and/or the riding behaviour. It is thus achieved that an automatic gear-changing behaviour is adapted to a rider's riding style, and the rider is not disturbed or impaired by less customized automatic gear changing. As such, embodiments of the invention are not only suitable for sporting riders, but also for everyday use of the bicycle.

In an embodiment, a change or shift can be made from an active gear i into the next higher gear i+1 when the speed exceeds a lower limit value of the next higher gearing range.

In an embodiment, a change or shift can be made from an active gear i into the next lower gear i−1 when the speed falls below an upper limit value of the next lower gearing range.

The speed at which a gear-change operation takes place can be assigned to this gear-change operation as a changeover speed. Expressed otherwise, the changeover speed is that speed at which the bicycle was moving at a most recently completed gear-change operation.

In an embodiment, the type of the next gear-change operation can be determined depending on the changeover speed. In this context, the type of the gear-change operation refers to "upward change" into the next higher gear or "downward change" into the next lower gear. Since the changeover speed indicates the speed at a most recent gear-change operation, not only the speed but also the changeover speed is taken account in the determination of the type of the next gear-change operation according to this development of the method.

In an embodiment, the type of the next gear-change operation in the overlap range can be determined depending on whether the most recent gear-change operation was an upward change or a downward change.

In an embodiment, an upward change can take place if the previous gear-change operation was an upward change and the speed exceeds a lower limit value of the gearing range Gi.

A downward change can take place when the previous gear-change operation was a downward change and the speed falls below an upper limit value.

In an embodiment, an upward change can take place if the previous gear-change operation was a downward change into the active gear i, the speed is higher than the previous changeover speed at least by a predetermined threshold value, and the speed is higher than the lower limit value of the next higher gearing range.

In this context, a downward change can take place if the previous gear-change operation was an upward change into the active gear, the speed is lower than the previous changeover speed at least by a predetermined threshold value, and the speed is lower than the upper limit value of the next lower gearing range.

A determination as to whether an upward change or a downward change will occur is thus made with reference to the profile of the speed since the most recently completed gear-change process, i.e. with reference to the changeover speed. Amongst other things this depends on whether the speed is above or below the previous changeover speed by a predetermined threshold value. If the speed here is below the upper limit value of the next lower gearing range, a downward change occurs. If on the other hand the speed rises above the lower limit value of the next higher gearing range, an upward change occurs.

Here, unlike in the prior art, predefined speed values that are, for example, read from tables, are not considered exclusively, but the profile of the speed and also the type of the last gear-change operation, which reflect the riding situation and/or the riding behaviour of the rider are taken into account.

The speed of the bicycle can be determined continuously or at predetermined sequential time points. The speed can, accordingly, be determined at predetermined time intervals. The profile of the speed between predetermined sequential time points can affect which gear is engaged or remains engaged. The profile of the speed can be stored in this context.

In an embodiment, each gearing range can correspond to a predetermined range of wheel speeds. A gearing range can, for example, be from 0 to 10 km/h, and the next higher gearing range can start at 8 km/h and finish at 20 km/h. The upper limit value of the gearing range 1 is set at 10 km/h. The lower limit value of the gearing range 2 is set at 8 km/h. The overlap range between gearing range 1 and gearing range 2 accordingly lies between 10 km/h, i.e. the upper limit value of gearing range 1, and 8 km/h, i.e. the lower limit value of gearing range 2. The overlap range according to this example thus corresponds to 2 km/h. In this overlap range of 2 km/h it is possible according to the invention to determine, depending on the profile of the speed and of the previous gear-change operation, whether gear i or gear i+1 is engaged or remains engaged.

The magnitude of the overlap range thus corresponds to the difference between the upper limit value of the lower gearing range and the lower limit value of the upper gearing range. To remain with the example described above, the overlap range of gearing range 1 and of gearing range 2 is between 8 and 10 km/h.

The type of a gear-change operation can, furthermore, be detected by at least one detection unit. Detection units of this sort can, for example, be position sensors, movement sensors or similar units, capable of detecting whether an upward change or a downward change has occurred.

According to a development of the invention, at least the type of the last gear-change operation and the changeover speed assigned to the last gear-change operation are stored.

In an embodiment, an electric gear-change apparatus in the form of a derailleur system or a gear hub is controlled.

In an embodiment, a control apparatus for controlling automatic gear-changing processes of an electric gear-change apparatus of a bicycle comprises a gearing range assignment unit that is configured to assign a predetermined gearing range to each gear, a limit range assignment unit that is configured to assign a predetermined lower limit value and a predetermined upper limit value to each gearing range, wherein the limit range assignment unit assigns the limit values in such a way that the upper limit value of a gearing range is in each case greater by a predetermined value than the lower limit value of the next higher gearing range, so that the upper limit value of a gearing range and the lower limit value of the next higher gearing range define between them an overlap range, and a speed detection unit for detecting the speed v of the bicycle.

The control device may furthermore comprise a gear detection unit that is configured to determine in the overlap range, depending on the profile of the speed, whether a gear i or a gear i+1 can be engaged.

According to an embodiment, the control apparatus may comprise a changeover unit that assigns a changeover speed to a previous gear-change operation.

The control device may include a determination unit that is configured to determine whether the speed after the changeover speed rises or falls by a value that is greater than or equal to a predetermined threshold value.

The control apparatus may include a detection unit that is configured to detect the type of a gear-change operation.

The control apparatus may also include a memory unit.

The electric gear-change apparatus may be a derailleur system or a gear hub of a bicycle.

Embodiments may be used include an electric gear-change apparatus for a bicycle with a control apparatus according to the type described above, wherein the electric gear-change apparatus is a derailleur system or a gear hub.

BRIEF DESCRIPTION OF THE DRAWINGS

Figures are described below that serve to explain an exemplary embodiment of the invention.

FIG. 1 shows a schematic illustration of individual gearing ranges and their overlap ranges;

FIGS. 2a to 2d illustrate various speed profiles and changeover points;

DETAILED DESCRIPTION OF THE DRAWINGS

Figure 2D:
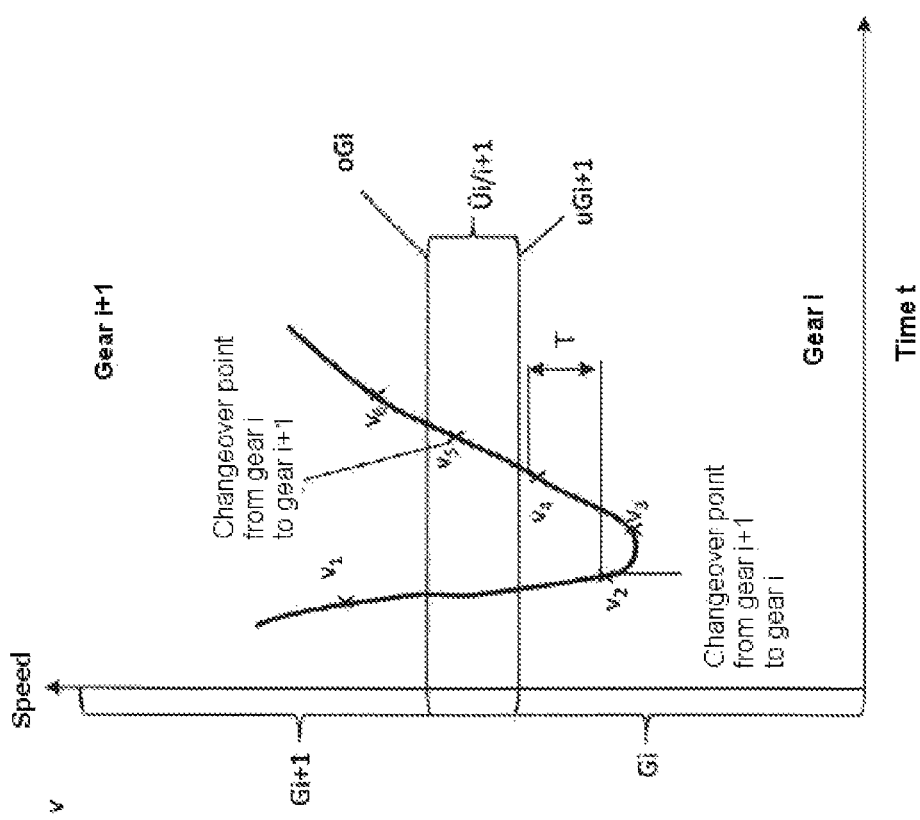

FIG. 1 shows a schematic illustration of various gearing ranges G1 to G3 along with the overlap ranges Ü1/2 and Ü2/3.

Gearing range G1 corresponds to 0 to 10 km/h, gearing range G2 corresponds to 8 to 18 km/h, and gearing range G3 corresponds to 16 to 26 km/h.

Gearing range G1 has a lower limit value uG1 of 0 km/h and an upper limit value oG1 of 10 km/h. Gearing range G2 has a lower limit value uG2 of 8 km/h and an upper limit value oG2 of 18 km/h. Gearing range G3 has a lower limit value uG3 of 16 km/h and an upper limit value oG3 of 26 km/h.

The overlap range Ü1/2 is located between the upper limit value oG1 of gearing range G1 and the lower limit value uG2 of gearing range G2. This means that the overlap range Ü1/3 between the limit value oG1, corresponds to 10 km/h, and the limit value oG2, corresponds to 8 km/h. The limit value oG1 is thus greater than the lower limit value uG2 of gearing range G2 by a predetermined value. This predetermined value between the limit value oG1 and the limit value oG2 is, according to this example, 2 km/h. This also applies to the overlap range Ü2/3 between gearing range G2 and G3, which lies between the upper limit value oG2 of gearing range G2 and the lower limit value uG3 of gearing range G3. In this context again, the upper limit value oG2 is greater than the lower limit value uG3 of gearing range G3 by a predetermined value. In the case of the overlap range Ü2/3 this value again corresponds to 2 km/h.

FIG. 2a shows a diagram of a possible speed profile and of the changeover points, determined according to an embodiment. The time t has been entered on to the abscissa. The ordinate is used to enter the speed v.

A plurality of speed measurement points are illustrated in the diagram according to FIG. 2a, and are indicated as v1 to v5. The gearing ranges Gi and the next higher gearing range G1+1 are illustrated schematically in the diagram. The gearing range Gi corresponds to gear i. Gear i may be an active gear. The gearing range Gi+1 corresponds to gear i+1.

The overlap range Üi/i+1 is formed between the upper limit value oGi of gearing range Gi and the lower limit value uGi+1. The limit value oGi is greater than the lower limit value uGi+1 by a predetermined value.

In the diagram according to the FIG. 2a the speed increases to speed v3. In this case the rider, or the bicycle, is accelerating. As the speed increases to speed v3, the speed v exceeds the lower limit value uGi+1 of gearing range Gi+1. The speed v is thus in the overlap range Üi/i+1.

Since the speed has exceeded the lower limit value uGi+1 of the next higher gearing range Gi+1, a change is made into the next higher gear i, which is assigned to gearing range Gi+1. The changeover point to change into gear i corresponds, in this example, to the speed v3. The speed v3 at the changeover point from gear i into gear i+1 is assigned to this gear-change operation as the changeover speed uv. The fact that the type of this gear-change operation was an upward change into the next higher gear i+1 is also detected and/or recorded. As described herein, a gear change and/or changeover may also be referred to as a gear shift or shifting action.

A short time after the changeover point (changeover speed v3) into the next higher gear i+1, the speed v of the bicycle falls. The speed v falls through speed v4 below the lower limit value uGi+1 of gearing range Gi+1.

As already explained, the speed at the changeover point, i.e. the speed v3, is assigned to this gear-changing process as the changeover speed uv. In an embodiment, the question of whether the speed v rises or falls by more than a predetermined threshold value T after the changeover speed v3 is now detected and/or recorded. The speed v falls in the example according to FIG. 2a. Following the changeover speed v3 at the changeover point, the speed drops to speed v5. During this fall to speed v5, the speed falls by more than the predetermined threshold value T, so that at speed v5 it is possible to change from gear i+1 into gear i. In this case the speed profile must thus satisfy v≤v3−T for a change into the next lower gear i.

In summary, FIG. 2a demonstrates that after the detection of an upward change process into the next higher gear i+1, the further development of the speed profile is detected and/or recorded. If, following the changeover speed, the speed falls below the lower limit value uGi+1, and by more than a predetermined threshold value T, a change is made back into gear i.

If the speed is more than a predetermined threshold value T below the changeover speed at the changeover point, a change is made from gear Gi+1 into gear Gi. The method according to the invention accordingly changes, following a gear-changing process in the overlap range, into a lower gear, if the speed is lower than the changeover speed by a predetermined threshold value T.

FIG. 2b illustrates a diagram of a speed profile that corresponds to an acceleration phase of the bicycle. The speed v of the bicycle here increases almost continuously. As soon as the speed v exceeds a lower limit value uGi+1 of the gearing range Gi+1, the method changes, at speed v3, from gear i corresponding to gearing range Gi into the gear i+1 corresponding to gearing range Gi+1. The speed v3 is in the overlap range Üi/i+1.

FIG. 2c illustrates a diagram of a speed profile between a deceleration phase and an acceleration phase.

The speed v falls from speed v1, and falls below the upper limit value oGi of gearing range Gi. The speed v is thus in the overlap range Üi/i+1. At speed v2 the gear is changed from the gear i+1 corresponding to gearing range Gi+1, into the gear i corresponding to gearing range Gi. The speed v2 is assigned to this gear-change operation as the changeover speed uv. The speed v falls below the lower limit value uGi+1 of gearing range Gi+1. After this, the bicycle accelerates, and the speed v again exceeds the lower limit range uGi+1 of gearing range Gi+1. The speed v is in the overlap range Üi/i+1. After speed v5, the speed v exceeds the upper limit value oGi of gearing range Gi. After having exceeded the upper limit value oGi the speed v also exceeds the changeover speed v2 by more than the threshold value T. When the speed following the most recent gear-change operation exceeds the changeover speed v2 by the predetermined threshold value T it is possible to change into the higher gear i+1 corresponding to the gearing range Gi+1. Accordingly, the speed v must in this case satisfy v≥v2+T in order to be able to change again into the next higher gear i+1.

FIG. 2d shows a further diagram of an example speed profile.

The bicycle at first decelerates sharply, so that the speed v falls rapidly from speed v1 down to speed v2. In the course of this fall, the speed curve passes through the overlap range Üi/i+1 and falls below the lower limit value uGi+1 of gearing range Gi+1. With this drop, the speed v accordingly also falls below the upper limit value oGi of the gearing range. After having fallen below the lower limit value uGi+1 a change is made at speed v2 from gear i+1 into the gear i corresponding to gearing range Gi. The speed v2 is assigned to this gear-change operation as the changeover speed uv. The bicycle is then accelerated again, and the speed v exceeds a value that is greater than the changeover speed v2 by the predetermined threshold value T. The speed v then exceeds the lower limit value uGi+1, and is located in the overlap range Üi/i+1. In the overlap range Üi/i+1 a change is made at speed v5 from the gear i corresponding to gearing range Gi into the gear i+1 corresponding to gearing range Gi+1. The speed v then continues to rise, and leaves the overlap range Üi/i+1. This gear-change operation is possible because the speed profile satisfies v≥v2+T and the speed v is in the overlap range Üi/i+1.

In an embodiment, a determination is made as to whether an upward change or a downward change is made in the overlap range Üi/i+1 with reference to the speed profile. After a preceding, or most recent, gear-change operation, it is then possible to change from gear i into gear i+1 when the speed v, after the changeover speed, rises by a value that is greater than or equal to a predetermined threshold value T. Furthermore, after a preceding gear-change operation it is possible to change back from gear i+1 into gear i if the speed v, after the changeover speed, falls by a value that is greater than or equal to a predetermined threshold value T.

In other words, following a gear-changing process in the overlap range, the development of the speed is further detected and/or recorded. After the most recent gear-changing process there is a pause, following the changeover point or the associated changeover speed, to see whether the speed v rises or falls by a predetermined threshold value T before the next gear-changing process can be carried out.

Figure 3:
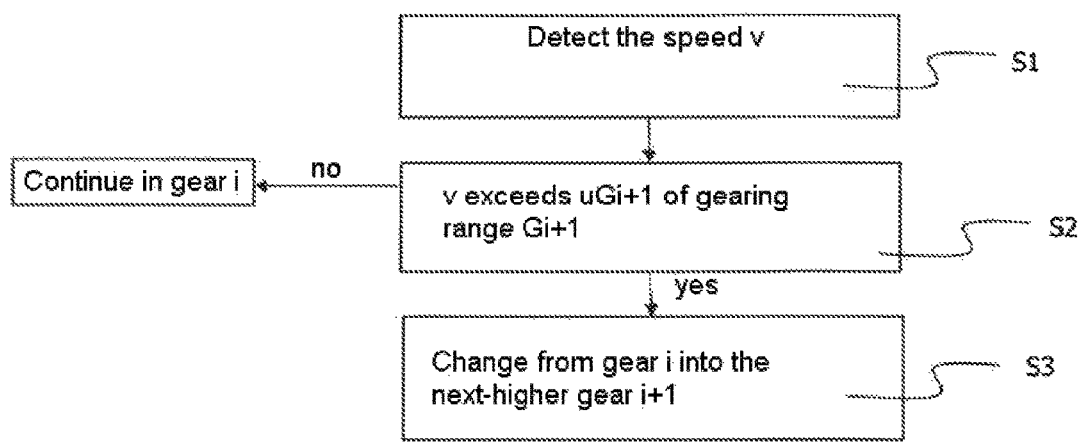
FIGS. 3 to 5 show schematic flow diagrams that illustrate the individual method steps of an exemplary embodiment of the method according to the invention.

FIG. 3 shows a flow diagram that illustrates an example upward change sequence. This upward change sequence corresponds to the diagram of the speed profile according to FIG. 2d.

Starting at step S1, the speed v is detected and/or recorded throughout the entire method.

In step S2 a determination is made as to whether the speed v is larger than the lower limit value uGi+1 of gearing range Gi+1. If this is not true, gear i remains engaged.

If the speed v is greater than the lower limit value uGi+1 then a change is made in step S3 into the next higher gear i+1 (+S).

Figure 4:
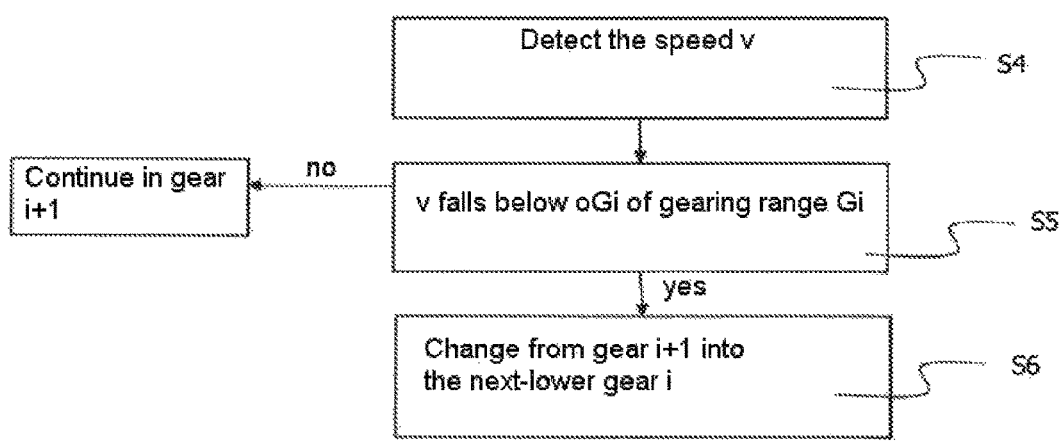

FIG. 4 shows a flow diagram that illustrates an exemplary downward change sequence.

Step S4 is only to clarify that the speed v of the bicycle is detected and/or recorded throughout the whole of the method.

In step S5 a determination is made as to whether the speed v is smaller than the upper limit value oGi of gearing range Gi. If this is not true, gear i+1 remains engaged.

If the speed v is smaller than the upper limit value oGi, then in step S6 a change is made into the next lower gear i (−S).

Figure 5:
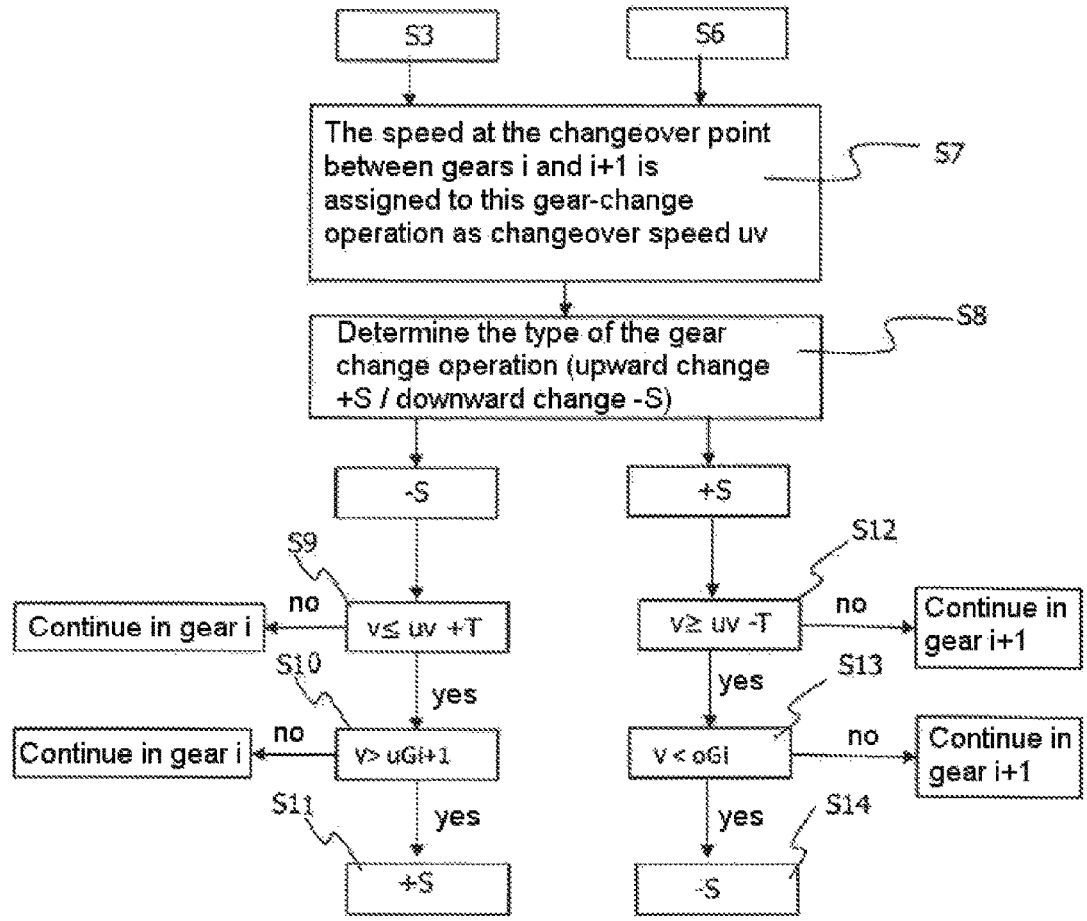

FIG. 5 shows a flow diagram that can follow either of the sequences according to FIG. 3 or FIG. 4, which means that one or more gear-change operations have already been executed.

Step S7 can follow either step S3 or step S6. In step S7 the speed at the changeover point between gears i and i+1 is assigned to this gear-change operation as the changeover speed uv. Regardless of whether previously an upward change process (+S) or a downward change process (−S) was made, a changeover speed is assigned to the last gear-change operation.

The type of the last gear-change operation, i.e. whether the most recent gear-change operation was an upward change process (+S) or a downward change process (−S), is determined in step S8.

If it is determined in step S8 that a downward change process (−S) was carried out, then in step S9 it is determined whether the speed v since the changeover point and the associated changeover speed uv has risen by a value that is greater than or equal to a predetermined threshold value T. A check is accordingly made to see whether v≥uv+T is satisfied.

If that is the case, then in step S10 a determination is made as to whether the speed v is larger than a lower limit value uGi+1 of gearing range Gi+1.

If the speed v is greater than the limit value uGi+1 then an upward change process (+S) is made in step S11.

The sequence according to steps S7 to S11 corresponds largely to the cases illustrated in FIGS. 2b and 2d. Steps S9 and S10 can also each be executed in the opposite sequence.

If it is determined in step S7 that an upward change process (+S) was carried out, then in step S12 it is determined whether the speed v since the changeover point and the associated changeover speed uv has fallen by a value that is greater than or equal to a predetermined threshold value T. A check is accordingly made as to whether v≤uv−T is satisfied.

If that is the case, then in step S13 a determination is made as to whether the speed v is smaller than an upper limit value oGi of gearing range Gi.

If the speed v is lower than the limit value oGi then a downward change process (−S) is made in step S14.

The sequence according to steps S7, S8 and S12 to S14 corresponds largely to the case illustrated in FIG. 2a. Steps S12 and S13 can also each be executed in the opposite sequence.

Figure 6:
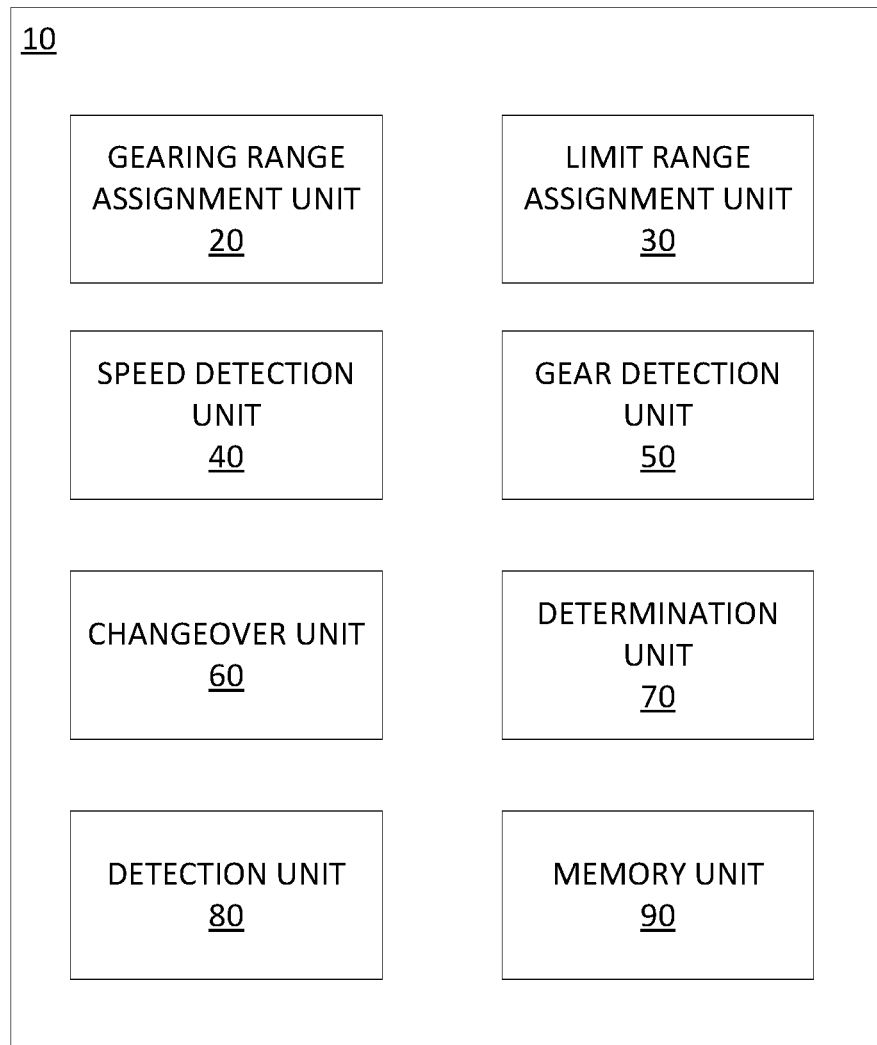
FIG. 6 illustrates a block diagram of a control device.

FIG. 6 illustrates a block diagram of a control device. In an embodiment, a control apparatus 10 for controlling automatic gear-changing processes of an electric gear-change apparatus of a bicycle comprises a gearing range assignment unit 20 that is configured to assign a predetermined gearing range to each gear, a limit range assignment unit 30 that is configured to assign a predetermined lower limit value and a predetermined upper limit value to each gearing range, wherein the limit range assignment unit assigns the limit values in such a way that the upper limit value of a gearing range is in each case greater by a predetermined value than the lower limit value of the next higher gearing range, so that the upper limit value of a gearing range and the lower limit value of the next higher gearing range define between them an overlap range, and a speed detection unit for detecting the speed v of the bicycle.

The control device 10 may furthermore comprise a gear detection unit 50 that is configured to determine in the overlap range, depending on the profile of the speed, whether a gear i or a gear i+1 can be engaged.

According to an embodiment, the control apparatus 10 may comprise a changeover unit 60 that assigns a changeover speed to a previous gear-change operation.

The control device 10 may include a determination unit 70 that is configured to determine whether the speed after the changeover speed rises or falls by a value that is greater than or equal to a predetermined threshold value.

The control apparatus 10 may include a detection unit 80 that is configured to detect the type of a gear-change operation.

The control apparatus 10 may also include a memory unit 90.

The electric gear-change apparatus may be a derailleur system or a gear hub of a bicycle.

Embodiments may be used include an electric gear-change apparatus for a bicycle with a control apparatus according to the type described above, wherein the electric gear-change apparatus is a derailleur system or a gear hub.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling automatic gear-changing of an electric gear-change apparatus of a bicycle, the method comprising:
    assigning, to a memory of a control device, each of a plurality of gears of the bicycle a predetermined gearing range;
    assigning, to the memory of the control device, a predetermined lower limit value and a predetermined upper limit value to each gearing range, wherein the upper limit value of a gearing range is in each case larger by a predetermined value than the lower limit value of a next higher gearing range, and the upper limit value of the gearing range and the lower limit value of the next higher gearing range define between them an overlap range;
    selecting, with the control device, an engagement of either a gear or a next higher gear in the overlap range depending on a speed profile of the bicycle;
    assigning, to the memory of the control device, a speed at which a gear-change operation takes place as a changeover speed of the gear-change operation; and
    determining, with the control device, a type of gear-change operation depending on the changeover speed, wherein determining the type of gear-change operation further depends on whether a most recent gear-change operation was an upward change or a downward change.

2. The method of claim 1, further comprising:
changing, with the control device, from an active gear into the next higher gear relative to the active gear when a second speed of the bicycle exceeds a lower limit value of the next higher gearing range.

3. The method of claim 1, further comprising:
changing, with the control device, from an active gear into a next lower gear to the active gear when a second speed falls below an upper limit value of a next lower gearing range.

4. The method of claim 1, further comprising:
making a second upward change when the most recent gear-change operation was the upward change and a second speed exceeds a lower limit value of the gearing range.

5. The method of claim 1, further comprising:
making a second downward change when the most recent gear-change operation was the downward change and a second speed falls below an upper limit value.

6. The method of claim 1, wherein the determining the type of gear-change operation further comprises:
determining, with the control device, whether a second speed after the changeover speed rises or falls by a value that is greater than or equal to a predetermined threshold value.

7. The method of claim 1, wherein the upward change is made if:
the most recent gear-change operation was the downward change into an active gear,
a second speed is higher than the changeover speed at least by a predetermined threshold value, and
the second speed is higher than the lower limit value of the next higher gearing range.

8. The method of claim 1, wherein the downward change is made if:
the most recent gear-change operation was the upward change into an active gear,
a second speed is lower than the changeover speed at least by a predetermined threshold value, and
The second speed is lower than the upper limit value of a next lower gearing range.

9. The method of claim 1, wherein the speed is detected, with a speed detecting unit, continuously or at predetermined sequential time points.

10. The method of claim 9, wherein the profile of the speed is stored to the memory of the control unit as the speed profile of the bicycle.

11. The method of claim 1, wherein each gearing range corresponds to a predetermined range of speeds.

12. The method of claim 1, wherein the type of the gear-change operation is detected by at least one detection unit.

13. The method of claim 1, further comprising:
storing at least the type of the most recent gear-change operation and the changeover speed assigned to the most recent gear-change operation.

14. The method of claim 1, wherein the changing from an active gear into the next higher gear to the active gear comprises changing from the active gear of a derailleur system or a gear hub into the next higher gear to the active gear of the derailleur system or the gear hub.

15. The method of claim 1, wherein the speed profile is a measure of a development of speed of the bicycle over time.

16. A control apparatus for controlling automatic gear-changing of a derailleur system or a gear hub of a bicycle, the control apparatus comprising:
    a gearing range assignment unit that is configured to assign, to a memory of the control apparatus, a predetermined gearing range to each gear,
    a limit range assignment unit that is configured to assign a predetermined lower limit value and a predetermined upper limit value to each of the gearing ranges to the memory, wherein the limit range assignment unit is configured to assign the limit values such that the upper limit value of the predetermined gearing range is in each case greater by a predetermined value than the lower limit value of a next higher gearing range, so that the upper limit value of the predetermined gearing range and the lower limit value of the next higher gearing range define between them an overlap range,
    a speed detection unit for detecting a speed of the bicycle, and a gear detection unit that is configured to determine whether a gear or a next higher gear can be engaged in the overlap range, depending on a speed profile and whether a most recent gear-change operation was an upward change or a downward change.

17. The control apparatus of claim 16, further comprising:
a changeover unit that assigns, to the memory, a changeover speed to the most recent gear-change operation.

18. The control apparatus of claim 17, further comprising:
a determination unit that is configured to determine whether the speed after the changeover speed rises or falls by a value that is greater than or equal to a predetermined threshold value.

19. The control apparatus of claim 16, further comprising:
a detection unit that is configured to detect a type of a gear-change operation.

20. A method for controlling automatic gear-changing of an electric gear-change apparatus of a bicycle, the method comprising:

assigning, to a memory of a control device, each of a plurality of gears of the bicycle a predetermined gearing range;

assigning, to the memory of the control device, a predetermined lower limit value and a predetermined upper limit value to each gearing range, wherein the upper limit value of a gearing range is in each case larger by a predetermined value than the lower limit value of a next higher gearing range, and the upper limit value of the gearing range and the lower limit value of the next higher gearing range define between them an overlap range;

selecting, with the control device, an engagement of either a gear or a next higher gear in the overlap range depending on a speed profile of the bicycle; and determining, with the control device, a type of gear-change operation depending on whether a most recent gear-change operation was an upward change or a downward change.

* * * * *